Patented Feb. 21, 1933

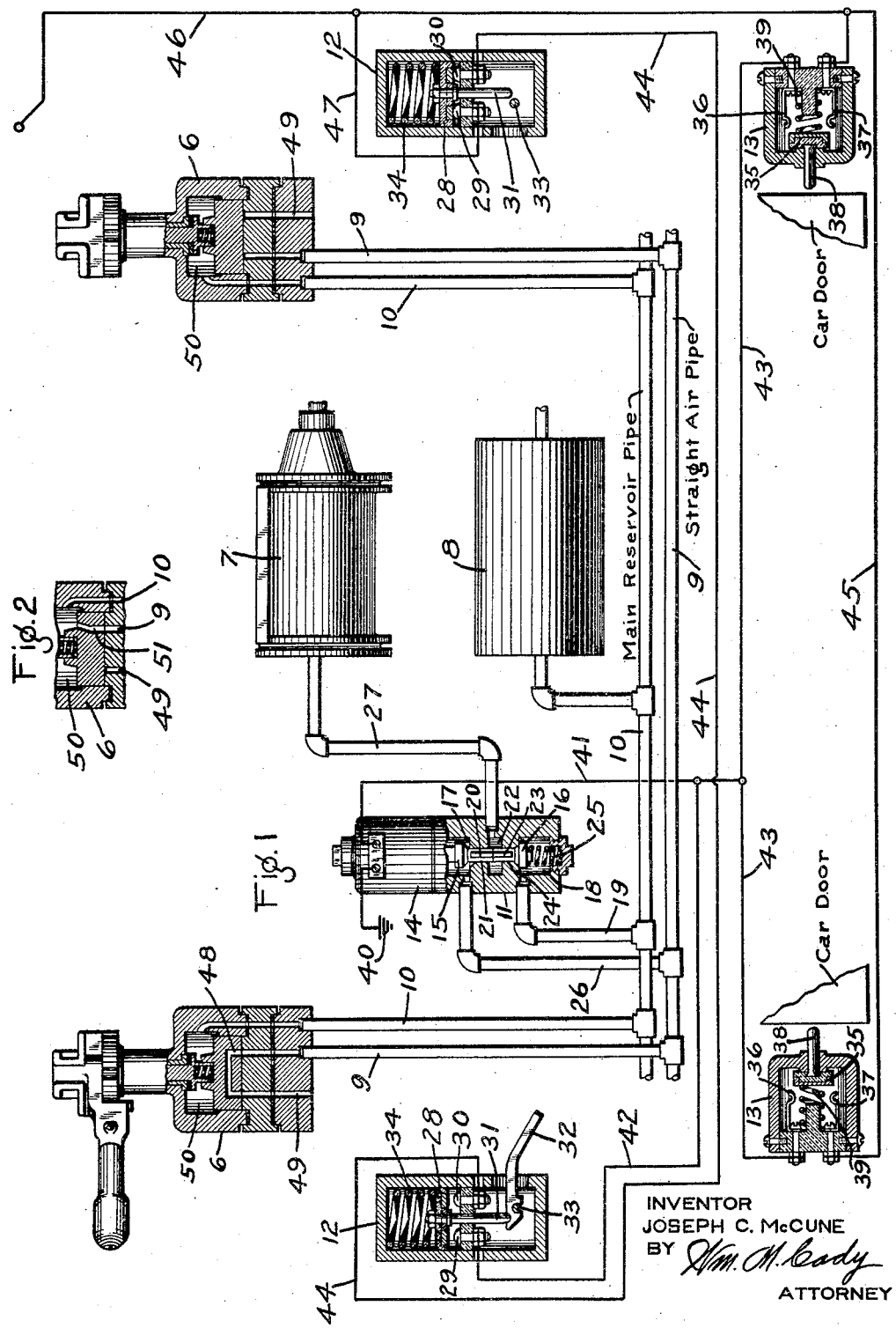

1,898,556

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

ELECTROPNEUMATIC BRAKE

Application filed March 22, 1930. Serial No. 438,140.

This invention relates to fluid pressure brakes, and more particularly to an electro-pneumatic brake.

An object of the invention is to provide an improved electro-pneumatic brake equipment by which the car may be safely controlled in case the operator should become disabled.

Another object of the invention is to provide an improved fluid pressure brake apparatus in which the brakes are maintained applied when a door of the car is open.

Another object of the invention is to provide an improved electro-pneumatic brake equipment having a single electro-magnet valve device, the circuit of which is controlled by a switch device operated by the foot of the operator and a switch device operated by a car door.

Another object of the invention is to provide an improved electro-pneumatic brake of the character mentioned which is single in construction, and reliable and exact in function under all conditions of service.

The invention also comprises certain new and useful improvements in the construction, arrangement, and combination of the several parts of which it is composed, as will be hereinafter more fully described and claimed.

In the accompanying drawing; Figure 1 is a diagrammatic view, partly in section, of a straight air brake equipment, showing the application of my invention thereto, the right hand brake valve being shown in lap position, and the left hand brake valve being shown in release position; and Fig. 2 is a detail section of a portion of the brake valve, showing the same in service position.

Referring to the drawing, the equipment may comprise a brake valve 6 at each end of the car, a brake cylinder 7, and a main reservoir or other source of fluid under pressure 8. Each brake valve 6 is connected to a straight air pipe 9, and the main reservoir 8 is connected to each brake valve 6 by a pipe 10.

The equipment also comprises an electrically operated valve device 11 for controlling the communication through which the brake cylinder 7 is connected to the straight air pipe 9, and also connected directly to the main reservoir 8.

At each end of the car there is a foot controlled switch device 12, and there is a switch device 13 for each door of the car. These switch devices are adapted to control the circuit through which the valve device 11 is operated.

The valve device 11 may comprise an electro-magnet 14 and valves 15 and 16 adapted to be operated by said magnet. The valve 15 is contained in a chamber 17, while the valve 16 is contained in a chamber 18, which is connected to the main reservoir pipe 10 by a pipe 19. The valve 15 has a fluted stem 20 extending through a suitable bore 21 in the casing and engaging in a chamber 22, a fluted stem 23 of the valve 16. The stem 23 extends through a suitable bore 24, which connects chambers 18 and 22. A spring 25, contained in chamber 18, acts on the valve 16, tending to seat said valve and unseat the valve 15. Chamber 17 is connected to the straight air pipe 9 by a pipe 26, and the chamber 22 is connected to the brake cylinder 7 by a pipe 27.

Each foot controlled switch device 12 may comprise a contact member 28, mounted in a suitable casing, and adapted to bridge contacts 29 and 30. The contact member 28 has a stem 31 projecting from one side thereof, which is adapted to be engaged by a removable foot pedal 32, fulcrumed on a pin 33, carried by the casing of the switch device. An expansible coil spring 34 acts on the side of the contact member 28 opposite to the stem 31, tending to maintain said contact member in engagement with the contacts 29 and 30, against the lifting force exerted by the pedal 32 on the stem when said pedal is depressed by the foot of the operator as shown at the left in Fig. 1 of the drawing.

Each door switch device 13 may comprise a contact member 35, mounted in a suitable casing, and adapted to bridge spring fingers 36 and 37. Projecting from one side of the contact member 35 is a stem 38 adapted to be engaged by a portion of the car door when the same is opened. Acting on the opposite side of said contact member is an expansible coil spring 39, which tends to maintain the contact member disengaged from the spring fingers 36 and 37.

One terminal of the magnet 14 is connected to a ground 40, and the other terminal of said magnet is connected to the contact 29 of one of the foot controlled switch devices 12 by wires 41 and 42, and also connected to the spring fingers 36 of the door switch devices 13 by a wire 43, which is connected to wire 42. The contacts 30 of the foot controlled switch devices 12 are connected by a wire 44. The spring fingers 37 of the car door switch devices 13 are connected by a wire 45, which in turn is connected to a source of current wire 46. The source of current wire 46 is also connected by a wire 47 to the contact 29 of the right hand foot switch device 12. It is to be noted that the foot switches 12 are connected in series, while the door switches 13 are connected in parallel.

In operation, when the brake valve 6 is in the release position shown in Fig. 1 of the drawing, and the magnet 14 is deenergized, the brake cylinder 7 will be vented to the atmosphere through pipe 27, chamber 22, bore 21, chamber 17, pipes 26 and 9, cavity 48 in the valve, and atmospheric exhaust port 49.

When it is desired to effect an application of the brakes, the brake valve 6 is operated in the usual manner to application position, in which position, fluid under pressure will be supplied to the brake cylinder 7 from the main reservoir 8, through pipe 10, valve chamber 50, port 51 in the valve, pipes 9 and 26, chamber 17, past unseated valve 15, bore 21, chamber 22, and pipe 27.

After an application, the brakes may be released by operating the brake valve 6 in the usual manner to vent the fluid from the brake cylinder.

As shown in Fig. 1, the arrangement of the circuit of the magnet 14 is such that one of the switch devices 12 is normally closed, while the other switch device 12 and the door switch devices 13 are normally open. In this way the magnet circuit is maintained open, and said circuit can be closed when either of the normally open switch devices are closed.

As long as the magnet 14 remain deenergized, a straight air application of the brakes can be effected by operating the brake valve 6 in the usual manner. However, should a car door be opened at any time, or should the operator remove his foot from the pedal 32, the magnet circuit will be closed.

With the opening of either door of the car, the contact member 35 of the switch device 13 adjacent to such car door, will be moved into engagement with the spring fingers 36 and 37, and the circuit will be closed, so that current is supplied from the source of current supply wire 46, through wires 45, 43 and 41 to the magnet 14, and thence to ground, and the magnet will be energized.

Energization of the magnet 14 seats the valve 15 and unseats the valve 16, and the fluid under pressure will flow from the main reservoir 8, through pipes 10 and 19, chamber 18, past the open valve 16, and through the bore 24, to chamber 22, and from thence to the brake cylinder 7, through pipe 27. In this way, if a car door is opened while the car is in motion, an application of the brakes will be automatically effected with fluid under pressure supplied to the brake cylinder directly from the source of supply, or should a car door be opened after a straight air application of the brakes, the brakes will be maintained applied with fluid under pressure supplied to the brake cylinder directly from the source of supply through the operation of the valve device 11 in the above described manner, and the brakes will be prevented from being released until the car door is closed and the switch 13 controlled thereby is opened.

If for any reason the operator should remove his foot from the pedal 32, spring 34 will force the contact member 28 into engagement with the contacts 29 and 30, and the circuit will be closed so that current is supplied to the magnet 14, and the magnet will be energized. With the magnet 14 energized, the valve device 11 is operated so as to cut off the communication from the brake valve 6 to the brake cylinder 7 and establish the communication from the main reservoir 8 directly to the brake cylinder, so that an automatic application of the brakes will be effected in the same manner as hereinbefore described. In this case, the brakes will be maintained applied until the foot pedal 32 is again depressed so as to open the switch device 12.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a straight air pipe, brake cylinder, main reservoir and brake valve for controlling the supply of fluid from the main reservoir to the brake cylinder, of a valve device adapted in one position to provide a communication through which the brake cylinder is connected with the brake valve, and in another position to provide a communication through which the brake cylinder is connected to the main reservoir, an electromagnet for actuating said valve device, and a plurality of switch devices for controlling the operation of said magnet, one of said switch devices being operated upon the movement of a car door to open position for closing a circuit through which said magnet is energized and another of said switch devices being operated when manually released, to close the circuit through which said magnet is energized.

2. In a fluid pressure brake, the combination with a brake cylinder, main reservoir, and brake valve for controlling the supply of fluid from the main reservoir to said brake cylinder, of a valve device for controlling communication between said main reservoir and said brake cylinder and between said brake valve and said brake cylinder, electromagnetic means for controlling the operation of said valve device, a plurality of manually controlled contact devices, a plurality of automatically controlled contact devices, and a plurality of parallel circuits for said electro-magnetic means, one of said circuits being controlled by one of said automatically controlled contact devices, another of said circuits being controlled by another of said automatically controlled contact devices, and still another of said circuits being controlled by said manually controlled contact devices in series.

3. In a fluid pressure brake, the combination with a brake cylinder, main reservoir, and brake valve for controlling the supply of fluid from the main reservoir to said brake cylinder, of a valve device for controlling communication between said main reservoir and said brake cylinder and between said brake valve and said brake cylinder, electromagnetic means for controlling the operation of said valve device, two manually controlled contact devices, two automatically controlled contact devices, each associated with a car door, and three parallel circuits for said electro-magnetic means, one of said circuits being controlled by one of said automatically controlled contact devices, another of said circuits being controlled by the other of said automatically controlled contact devices, and another of said circuits being controlled by both of said manually controlled contact devices in series.

4. In a fluid pressure brake, the combination with a brake cylinder, main reservoir, and brake valve for controlling the supply of fluid from the main reservoir to said brake cylinder, of a valve device for controlling communication between said main reservoir and said brake cylinder and between said brake valve and said brake cylinder, electromagnetic means for controlling the operation of said valve device, two manually controlled contact devices, two automatically controlled contact devices each associated with a car door, and three normally open parallel circuits for said electro-magnetic means, two of said circuits each being controlled by one of said automatically controlled contact devices, and one of said circuits being controlled by both of said manually controlled contact devices in series.

5. In a fluid pressure brake, the combination with a brake cylinder, main reservoir, and brake valve for controlling the supply of fluid from the main reservoir to said brake cylinder, of a valve device for controlling communication between said main reservoir and said brake cylinder and between said brake valve and said brake cylinder, electromagnetic means for controlling the operation of said valve device, two manually controlled contact devices, two automatically controlled contact devices each associated with a car door, and three parallel circuits for said electro-magnetic means, two of said circuits each being controlled by one of said automatically controlled contact devices, and one of said circuits being controlled by both of said manually controlled contact devices in series, both of said automatically controlled contact devices and one of said manually controlled contact devices being normally open and one of said manually controlled contact devices being normally closed.

In testimony whereof I have hereunto set my hand, this 20th day of March, 1930.

JOSEPH C. McCUNE.